(12) United States Patent
Houga et al.

(10) Patent No.: US 8,858,664 B2
(45) Date of Patent: Oct. 14, 2014

(54) AQUEOUS RESIN COMPOSITION FOR ABRASIVE ARTICLES AND RESULTING ARTICLES

(71) Applicants: Clément Houga, Houilles (FR); Alix Arnaud, Montrouge (FR); Charles G. Herbert, Shrewsbury, MA (US)

(72) Inventors: Clément Houga, Houilles (FR); Alix Arnaud, Montrouge (FR); Charles G. Herbert, Shrewsbury, MA (US)

(73) Assignees: Saint-Gobain Abrasives, Inc., Worcester, MA (US); Saint-Gobain Abrasifs, Conflans-Saint-Honorine (FR)

( * ) Notice: Subject to any disclaimer, the term of this patent is extended or adjusted under 35 U.S.C. 154(b) by 0 days.

(21) Appl. No.: 13/713,945

(22) Filed: Dec. 13, 2012

(65) Prior Publication Data
US 2013/0263520 A1    Oct. 10, 2013

(30) Foreign Application Priority Data

Dec. 13, 2011 (FR) .................................. 11 61555

(51) Int. Cl.
| | |
|---|---|
| B24D 3/20 | (2006.01) |
| B24D 11/02 | (2006.01) |
| C08G 73/02 | (2006.01) |
| C08L 79/04 | (2006.01) |
| C08L 79/02 | (2006.01) |
| B24D 11/00 | (2006.01) |
| B24D 3/28 | (2006.01) |

(52) U.S. Cl.
CPC .............. *B24D 3/28* (2013.01); *C08G 73/0286* (2013.01); *C08G 73/022* (2013.01); *C08L 79/04* (2013.01); *C08L 79/02* (2013.01); *B24D 11/001* (2013.01); *C08G 73/0226* (2013.01); *C08G 73/0293* (2013.01); *C08G 73/0273* (2013.01)
USPC ............................................... 51/298; 51/307

(58) Field of Classification Search
USPC .................................. 51/298, 307; 428/537.1
See application file for complete search history.

(56) References Cited

U.S. PATENT DOCUMENTS

| | | |
|---|---|---|
| 3,733,290 A | 5/1973 | Williams et al. |
| 4,047,903 A | 9/1977 | Hesse et al. |

(Continued)

FOREIGN PATENT DOCUMENTS

| | | |
|---|---|---|
| EP | 1470893 | 10/2004 |
| FR | 2924719 | 6/2009 |

(Continued)

OTHER PUBLICATIONS

Carr, M.E., et al., "Interpolymer from Starch Xanthate and Polyamide-Polyamine-Epichlrohydrin Resin in Linerboard and Newsprint", Purchased from U.S. Dept. of Agriculture for Official Use, The Journal of the Technical Association of the Pulp and Paper Industry, vol. 57, No. 10, Oct. 1974, Tappi, pp. 127-129.

(Continued)

*Primary Examiner* — Pegah Parvini
(74) *Attorney, Agent, or Firm* — Joseph P. Sullivan; Abel Law Group, LLP (57) ABSTRACT

An aqueous polymer binder composition adapted for the manufacture of abrasive articles, such as coated abrasive articles, comprising at least one resin containing at least two azetidinium groups and at least one saccharide. The aqueous composition is formaldehyde-free and can further comprise proteins, starch grafted acrylic styrene, co-cross-linking agents, rheology modifiers, fillers, and hydrophobizing agents.

18 Claims, 6 Drawing Sheets

(56) References Cited

U.S. PATENT DOCUMENTS

| | | |
|---|---|---|
| 4,702,947 A | 10/1987 | Pall et al. |
| 5,094,672 A | 3/1992 | Giles, Jr. et al. |
| 5,110,878 A | 5/1992 | Amey |
| 5,178,646 A | 1/1993 | Barber, Jr. et al. |
| 5,213,588 A | 5/1993 | Wong et al. |
| 5,221,296 A * | 6/1993 | Schwerzel et al. ............ 51/298 |
| 5,236,762 A | 8/1993 | Suzuki et al. |
| 5,523,152 A | 6/1996 | Thurber et al. |
| 5,786,065 A | 7/1998 | Annis et al. |
| 6,056,855 A | 5/2000 | Amey |
| 6,165,322 A | 12/2000 | Bower |
| 6,359,040 B1 | 3/2002 | Burdick |
| 7,018,490 B2 | 3/2006 | Hansen et al. |
| 7,060,798 B2 | 6/2006 | Li et al. |
| 7,252,735 B2 | 8/2007 | Li |
| 7,781,501 B2 | 8/2010 | Dopico et al. |
| 7,829,611 B2 | 11/2010 | Kelly |
| 2005/0261404 A1 | 11/2005 | Rivers et al. |
| 2007/0054144 A1 * | 3/2007 | Dopico et al. ............ 428/537.1 |
| 2010/0222459 A1 | 9/2010 | Kelly et al. |
| 2010/0282996 A1 | 11/2010 | Jaffrennou et al. |
| 2010/0294725 A1 | 11/2010 | Bush et al. |

FOREIGN PATENT DOCUMENTS

| | | |
|---|---|---|
| WO | 99/32719 | 7/1999 |
| WO | 2004-094110 | 11/2004 |

OTHER PUBLICATIONS

PCT/US2012/069529, International Search Report mailed Mar. 28, 2013, 1 pg.

PCT/US2012/069567, International Search Report mailed Mar. 26, 2013, 1 pg.

* cited by examiner

AQUEOUS RESIN COMPOSITION FOR ABRASIVE ARTICLES AND RESULTING ARTICLES

CROSS-REFERENCE TO RELATED APPLICATION(S)

The present application claims priority from French Application No. 1161556, filed Dec. 13, 2011, entitled "AQUEOUS RESIN COMPOSITION FOR ABRASIVE ARTICLES AND RESULTING ARTICLES," naming inventors Clément Houga, Alix Arnaud and Charles G. Herbert, and said provisional application is incorporated by reference herein in its entirety for all purposes.

FIELD OF THE DISCLOSURE

The present invention relates to an aqueous resin binder composition, abrasive articles including the same, and methods of making and using the aqueous resin binder composition and abrasive articles.

BACKGROUND

Abrasive articles, such as coated abrasive articles, are used in various industries to abrade work pieces by hand or by machine processes, such as by lapping, grinding, or polishing. Machining utilizing abrasive articles spans a wide industrial and consumer scope from optics industries, automotive paint repair industries, and metal fabrication industries to construction and carpentry. Machining, such as by hand or with use of commonly available tools such as orbital polishers (both random and fixed axis), and belt and vibratory sanders, is also commonly done by consumers in household applications. In each of these examples, abrasives are used to remove surface material and affect the surface characteristics (e.g., planarity, surface roughness, gloss) of the abraded surface. Additionally, various types of automated processing systems have been developed to abrasively process articles of various compositions and configurations.

Surface characteristics include, among others, shine, texture, gloss, surface roughness, and uniformity. In particular, surface characteristics, such as roughness and gloss, are measured to determine quality. Typically, defects in a surface are removed by first sanding with a coarse grain abrasive, followed by subsequently sanding with progressively finer grain abrasives, and even buffing with wool or foam pads until a desired smoothness is achieved. Hence, the properties of the abrasive article used will generally influence the surface quality.

In addition to surface characteristics, users are sensitive to cost related to abrasive operations. Factors influencing operational costs include the speed at which a surface can be prepared and the cost of the materials used to prepare that surface. Typically, a user seeks cost effective materials having high material removal rates.

However, abrasives that exhibit high removal rates often exhibit poor performance in achieving desirable surface characteristics. Conversely, abrasives that produce desirable surface characteristics often have low material removal rates. For this reason, preparation of a surface is often a multi-step process using various grades of abrasive. Typically, surface flaws (e.g., scratches) introduced by one step are repaired (e.g., removed) using progressively finer grain abrasives in one or more subsequent steps. Therefore, abrasives that introduce scratches and surface flaws result in increased time, effort, and expenditure of materials in subsequent processing steps and an overall increase in total processing costs.

In an effort to achieve certain abrasive performance characteristics (e.g., cut rate, surface finish, abrasive grain retention, mechanical stress resistance, thermal resistance, and solvent resistance) under demanding conditions (e.g., high-speed abrading and grinding), conventional abrasive articles typically incorporate components, such as polymer binder systems, abrasive grains, and backing materials that contain environmentally harmful chemicals or are themselves environmentally unfriendly due to a lack of biodegradability, recyclability, or re-usability.

For instance, phenol-formaldehyde resins (i.e., novolac and resole resins) and urea-formaldehyde resins are commonly encountered as abrasive binder compositions in conventional abrasive articles. At least one drawback of these phenol-formaldehyde and urea-formaldehyde resins is that they contain formaldehyde, which can be harmful to people and the environment.

Although various efforts have been made to replace various components of abrasive articles, there continues to be a demand for improved, cost effective, abrasive articles, processes, and systems that can promote and achieve efficient abrasion and improved surface characteristics, but that are at the same time environmentally friendly.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The present inventors have surprisingly discovered abrasive article embodiments that achieve or exceed the performance characteristics of certain conventional abrasive articles, but that do not rely on phenol-formaldehyde or urea-formaldehyde binder compositions. Embodiments described in greater detail below comprise an aqueous resin composition adapted to be used as a binder of abrasive particles and are formaldehyde-free.

Figure 1:
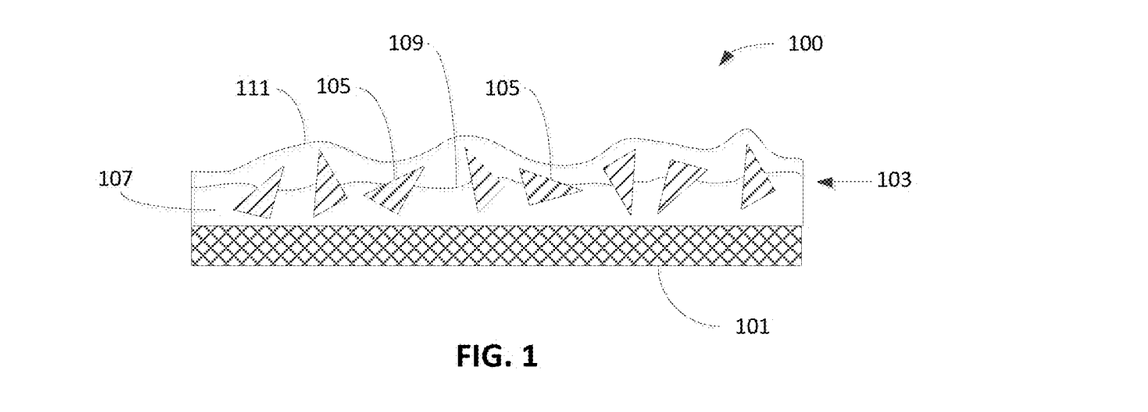
FIG. 1 is an illustration of a cross-section of a coated abrasive embodiment according to the present invention.

Illustrated in FIG. 1 is an embodiment of a coated abrasive article 100, commonly called a "coated abrasive." The coated abrasive 100 includes a backing 101 and an abrasive layer 103 disposed on the backing 101. The abrasive layer 103 comprises a plurality of abrasive particles 105 that are retained by a polymer binder composition 107. The polymer binder composition 107 is commonly called a "make coat" where the abrasive particles 105 are disposed on the surface 109 of the polymer binder composition and are partially embedded in the polymer binder composition. The coated abrasive 100 can also include a size coat 111 overlying the abrasive layer 103. Optionally, a supersize coat (not illustrated) can be overlying the size coat 111. Further, an adhesion promoting layer (not illustrated) can optionally be located between the backing 101 and the abrasive layer 103.

Figure 2:
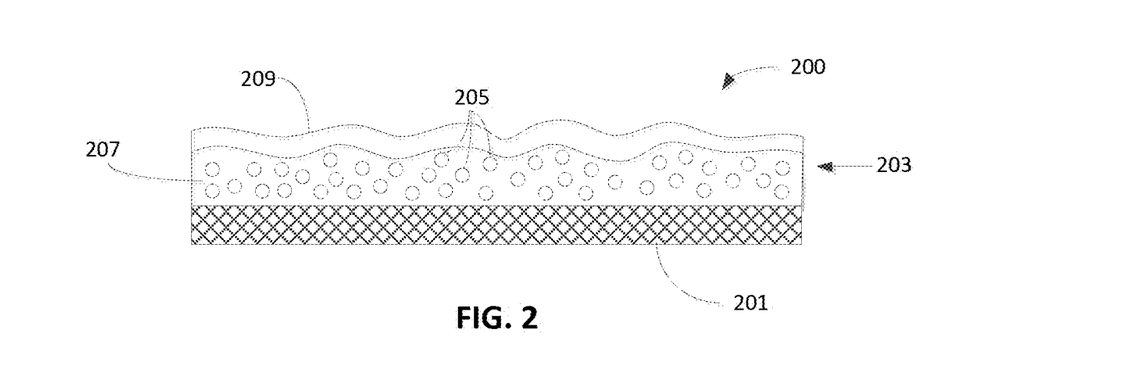
FIG. 2 is an illustration of a cross-section of another coated abrasive embodiment according to the present invention.

Illustrated in FIG. 2 is another embodiment of a coated abrasive article 200. The coated abrasive 200 includes a backing 201 and an abrasive layer 203 disposed on the backing 201. The abrasive layer 203 comprises a plurality of abrasive particles 205 dispersed within a polymer binder composition 207. The abrasive layer 203 is commonly called an "abrasive slurry coat" where the abrasive particles 205 are dispersed within the polymer binder composition 207. The coated abrasive 200 can also include a size coat 209 overlying the abrasive layer 203. Optionally, a supersize coat (not illustrated) can be overlying the size coat 209. Further, an adhesion promoting layer (not illustrated) can optionally be located between the backing 201 and the abrasive layer 203.

Figure 3:
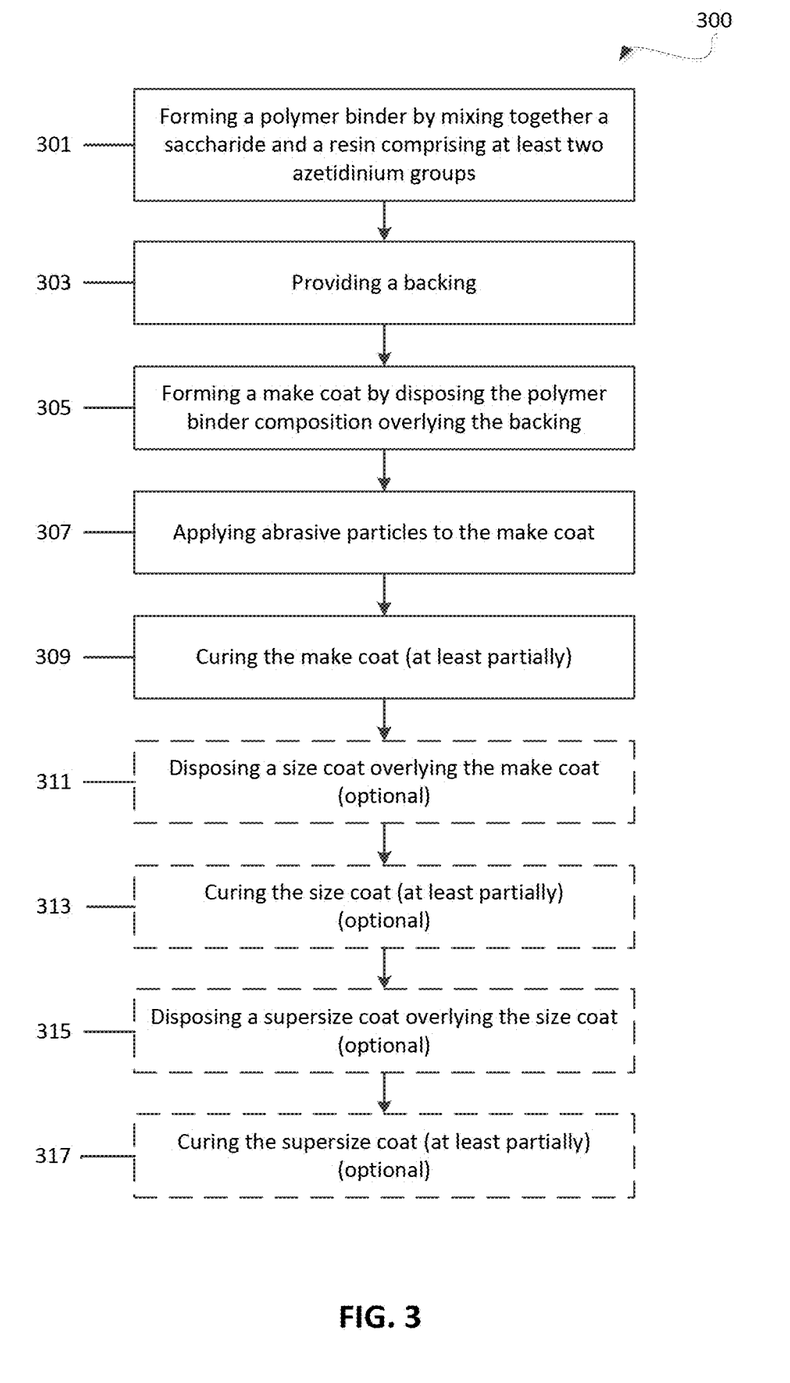
FIG. 3 is an illustration of a flowchart of a method of making a coated abrasive according to the present invention.

Illustrated in FIG. 3 is an embodiment of a process 300 for preparing a coated abrasive article. In step 301, forming a polymer binder composition occurs by mixing together a saccharide and a resin comprising at least two azetidinium groups. In step 303, providing a backing occurs. In step 305, forming a make coat occurs by disposing the polymer binder composition overlying the backing. Applying abrasive particles to the make coat occurs in step 307. Curing of the make coat occurs in step 309. The curing in step 309 can be partial curing of the make coat or full curing of the make coat. In an optional step 311, a size coat can be disposed overlying the make coat. Curing of the size coat can occur in step 313. The curing in step 313 can be partial curing of the size coat or full curing of the size coat. In optional step 315, a supersize coat can be disposed overlying the size coat. Curing of the supersize coat can occur in step 317. The curing in step 317 can be partial curing of the supersize coat or full curing of the supersize coat.

Figure 4:
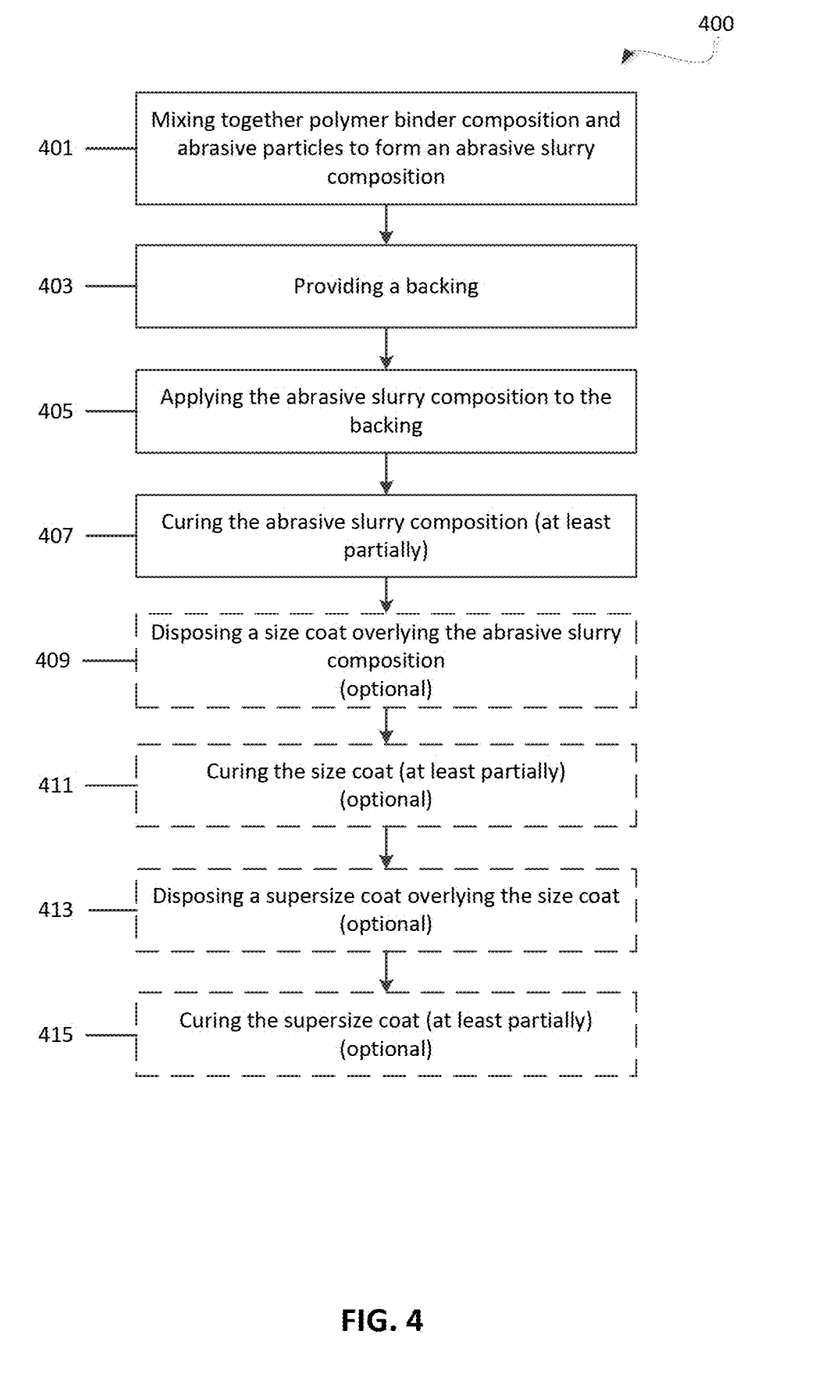
FIG. 4 is an illustration of a flowchart of another method making a coated abrasive according to the present invention.
Figure 5:
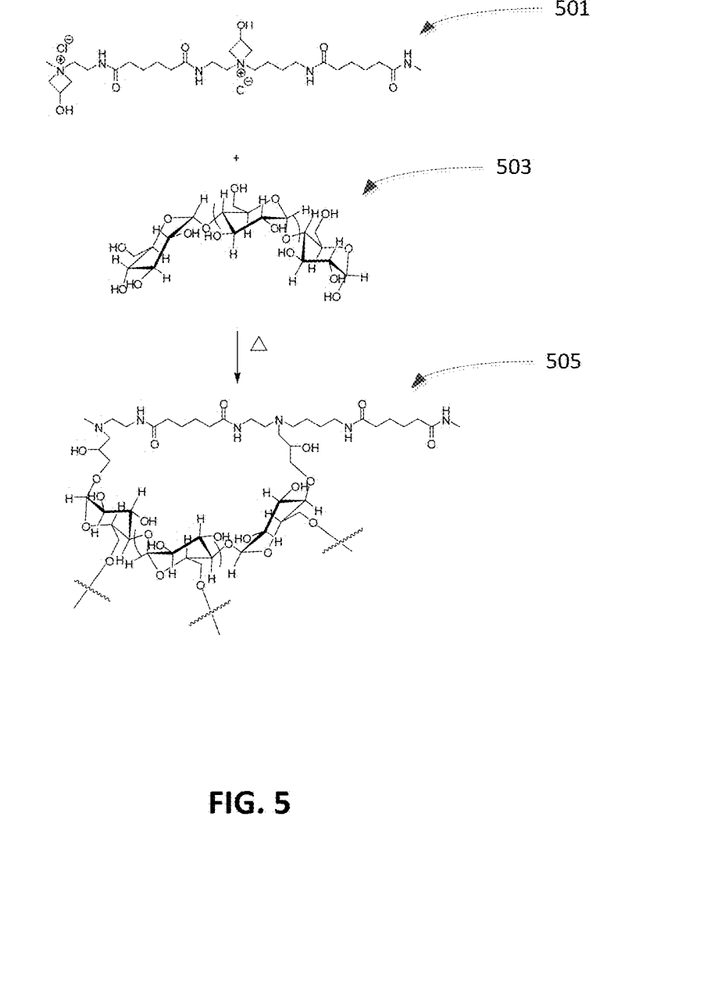
FIG. 5 is an illustration of the reaction and cross-linked binder chemistry of a polymer binder composition embodiment according to the present invention

Illustrated in FIG. 4 is an embodiment of a process 400 for preparing a coated abrasive article. In step 401, mixing together of polymer binder composition of saccharide and a resin comprising at least two azetidinium groups and abrasive particles occurs to form an abrasive slurry composition. In step 403, providing a backing occurs. Applying the abrasive slurry composition to the backing occurs in step 405. Curing of the abrasive slurry composition occurs in step 407. The curing in step 407 can be partial curing of the abrasive slurry composition or full curing of the abrasive slurry composition. In an optional step 409, a size coat can be disposed overlying the abrasive slurry composition. Curing of the size coat can occur in step 411. The curing in step 411 can be partial curing of the size coat or full curing of the size coat. In optional step 413, a supersize coat can be disposed overlying the size coat. Curing of the supersize coat can occur in step 415. The curing in step 415 can be partial curing of the supersize coat or full curing of the supersize coat.

Abrasive Layer

An abrasive layer can comprise a make coat or an abrasive slurry. The make coat or abrasive slurry can comprise a plurality of abrasive particles, also referred to herein as abrasive grains, retained by a polymer binder composition. The polymer binder composition can be an aqueous composition. The polymer binder composition can be a thermosetting composition. The polymer binder composition can be a thermosetting composition. In an embodiment, the polymer binder composition is an aqueous thermosetting composition comprising at least one saccharide and at least two azetidinium groups.

Saccharides

The present embodiments comprise at least one saccharide. The at least one saccharide can include saccharides that are the same or are different. In an embodiment, the at least one saccharide can be a monosaccharide, monosaccharides, an oligosaccharide, oligosaccharides, a polysaccharide, polysaccharides, or combinations thereof.

A monosaccharide can have 3 to 8 carbon atoms. In an embodiment, a monosaccharide can be an aldose having 5 to 7 carbon atoms. In another embodiment, a monosaccharide can be a hexose. In a particular embodiment, a hexose can be glucose, mannose, galactose, or combinations thereof.

A polysaccharide has a number-average molecular weight of less than 5000. In an embodiment, a polysaccharide can have a polydispersity index (IP), defined as the ratio of the weight-average molecular weight of the polysaccharide to the number-average molecular weight of the polysaccharide that is less than or equal to 12. In an embodiment, a polysaccharide comprises at least two saccharide units. The at least two saccharide units can be the same or different. In an embodiment the at least two saccharide units can be aldoses. In a specific embodiment the at least two saccharide units are glucose. In a particular embodiment, a polysaccharide is predominantly (more than 50% by weight) glucose units.

In another embodiment, the at least one saccharide can be a mixture of monosaccharides, oligosaccharides, polysaccharides, or combinations thereof that are obtained from plants. In a particular embodiment, the at least one saccharide is corn syrup. Corn syrup is a liquid mixture of partially hydrolyzed starch comprised of oligosaccharides, maltose, and dextrose.

In another embodiment, the at least one saccharide is a dextrin or combination of dextrins. Dextrins are compounds corresponding to the general formula $(C_6H_{10}O_5)_n$, usually obtained by partial hydrolysis of starch. In a particular embodiment, the dextrin is a solid low molecular weight crystalline polysaccharide.

It should be noted that certain polysaccharide based raw materials, such as starch, cellulose, and chitin are not acceptable polysaccharides because such materials, when reacted with the azetidinium compounds described in greater detail below, produce compositions that are too viscous to be efficiently processable as a coated abrasive binder composition.

Proteins

The polymer binder composition can also in include one or more protein based materials. Protein based materials can mitigate hygroscopic behavior of the polymer binder composition. Protein based materials can also improve adhesion of abrasive grains to the polymer binder composition, as well as adhesion of the polymer binder composition to a backing material. Protein based materials can include raw proteins, modified proteins, denatured proteins, or combinations thereof. Protein based materials can be the same or different. In an embodiment, protein based materials are derived from natural sources. In a specific embodiment, protein based material can be soy proteins, milk proteins, or combinations thereof. A soy protein can be a modified soy protein, a denatured soy protein, or combinations thereof. In particular embodiment, the protein based material is a soy protein. Milk proteins can be casein proteins, whey proteins, or combinations thereof. Casein proteins can include: $\alpha s1$-, $\alpha s2$-, $\beta$-, and $\kappa$-caseins, and combinations thereof. Whey proteins can include enzymes, lactoglobulin, and combinations thereof. In a specific embodiment, the protein based material is whey protein. In another specific embodiment, the protein based material is whey protein. In an embodiment, protein based material can be a micro-particulate solid. In another embodiment, the protein based material can have a very narrow particle size distribution. In another embodiment, the protein based material can be a spray dried material. In an embodiment, the protein based material can be derived from a concentrate.

Starch Grafted Acrylic Styrene

The polymer binder composition can also in include a starch grafted acrylic styrene co-polymer. In an embodiment, a starch grafted acrylic styrene co-polymer can comprise starch and a synthetic acrylic. In a specific embodiment, a starch grafted acrylic styrene co-polymer can have a solids portion that is up to about 80%, 75%, 70%, 65%, 60%, 55%, 50%, 45%, 40%, or 35% starch, with the remainder being a synthetic acrylic. In a specific embodiment, the starch grafted acrylic styrene co-polymer has a solids portion of 67% starch, with the remainder being synthetic acrylic.

Curative/Cross-Linking Agent

The polymer binder composition comprises at least two azetidinium groups. In an embodiment, the polymer binder composition comprises a thermosetting resin that includes at least two azetidinium groups. As used herein, the expression "polyazetidinium resin" refers to a thermosetting resin that includes at least two azetidinium groups.

An azetidinium group has the structure corresponding to formula (I) below:

in which X represents a halogen, preferably a chlorine atom.

A polyazetidinium resin can be an adduct of a halohydrin and a polyamine or polyamidoamine resin. A polyazetidinium resin can be soluble or dispersible in water.

In an embodiment, a polyazetidinium resin can be obtained by reacting a polyamine or polyamidoamine resin with a halohydrin. In a specific embodiment, the halohydrin can be epichlorohydrin, epibromohydrin, or combinations thereof. In an embodiment, the polyamine resin can be a polyalkylene polyamine. In a specific embodiment, the polyalkylene polyamine can be diethylenetriamine, triethylenetetramine, or combinations thereof. In an embodiment, a polyamidoamine resin can be obtained by reacting a polyamine and a polycarboxylic acid. In a specific embodiment, the polyamine can be a polyalkylene polyamine. In a specific embodiment, the polyalkylene polyamine can be diethylenetriamine, triethylenetetramine, or combinations thereof, as described above. In an embodiment, the polycarboxylic acid can be a diacid. In a specific embodiment, the polycarboxylic acid can be succinic acid, adipic acid, oxalic acid, phthalic acid, or combinations thereof.

A polyazetidinium resin can comprise a single resin or mixture of resins resulting from the reaction of a halohydrin with a polyamine or a polyamidoamine. The molar ratio of the polyamine and of the polycarboxylic acid can vary and the polyamidoamine resin can have terminal acid or primary amine functions. In a specific embodiment, the polyazetidinium resin is the reaction product of epichlorohydrin and of a polyamidoamine, wherein the polyamidoamine is obtained by reacting diethylenetriamine and adipic acid. In a specific embodiment, the polyazetidinium resin is soluble in water. In a specific embodiment, the polyazetidinium resin is an aqueous resin.

In another specific embodiment, the polymer binder can comprise a polysaccharide binder cross-linked with a polyazetidinium functionalized moiety.

Co-Cross-Linking Agents

The polymer binder composition can include additional cross-linking agents. Suitable additional cross-linking agents can be any chemical moiety capable of reacting with the free hydroxyl groups of the saccharide. An additional crosslinking agent can be a compound containing at least one functional group chosen from carboxylic acids, carboxylic acid anhydrides, epoxies, ketones, and aldehydes. In an embodiment, an additional crosslinking agent can be a monofunctional or polyfunctional aldehyde, except for formaldehyde. In a specific embodiment, the additional cross-linking agent can be glyoxal, a carboxylic acid containing a ketone function, or a carboxylic acid containing an aldehyde function. In a particular example, the additional cross-linking agent can be glyoxal, glyoxylic acid, or combination thereof.

Rheology Modifiers

The polymer binder composition can include one or more rheology modifiers. A rheology modifier can be used to influence the viscosity of the polymer binder composition and thus influence the orientation of abrasive particles applied to a make coat. In an embodiment, a rheology modifier can be a single type of rheology modifier or a mixture of rheology modifiers. In an embodiment, a rheology modifier can be derived from environmentally sustainable materials. In a specific embodiment, a rheology modifier can be starch, Bentonite clay, ethyl cellulose, methyl cellulose, fumed silica, a polysaccharide based gum, or combinations thereof. In a specific embodiment, a rheology modifier can be pectin, xanthan gum, gum Arabic, or combinations thereof. In a particular embodiment, a rheology modifier is Xanthan gum. A rheology modifier can be activated by exposure to heat prior to use.

Fillers

The polymer binder composition can include one or more fillers. The filler can be a single type of filler or a mixture of fillers. The filler can serve to increase the Young's modulus of the polymer binder composition. The filler can serve to modify the pH of the polymer binder composition. Suitable fillers can be synthetic materials or naturally occurring materials. A filler can be an inorganic or organic material. In an embodiment, the filler is derived from an environmentally sustainable material. Suitable inorganic fillers can include calcium carbonate, calcium sulfate (gypsum), or combinations thereof. Suitable organic fillers can include hard materials that are biodegradable. In an embodiment, an organic filler can include ground nut shells.

Hydrophobic Additives/Hydrophobizing Agents

The polymer binder composition can include one or more hydrophobic additives, also called hydrophobizing agents herein they impart improved water resistance. The hydrophobic additives can be a single type of hydrophobic additive or a mixture of hydrophobic additives. The hydrophobic additives can serve to reduce water absorption and preserve mechanical strength. Further, hydrophobic additives can reduce surface tackiness, thus avoiding blocking problems during production of rolled coated abrasive product, as well as avoiding excessive swarf pick up during sanding operations. Moreover, because steam is commonly used during the production of coated abrasives to mitigate edge curl, degradation of a coated abrasive's size coat and/or make coat can be avoided by the inclusion of hydrophobic additives. Suitable hydrophobic additives can be synthetic materials or naturally occurring materials. A hydrophobic additive can be an inorganic or organic material. In an embodiment, the hydrophobic additive is derived from an environmentally sustainable material. Suitable organic hydrophobic additives can include materials that are biodegradable. In an embodiment, an organic hydrophobic additive can be tall oil fatty acid dimer emulsions, abietic acid salts, tree rosin soaps, vegetable based waxes, levulinic acid, and combinations thereof. In a specific embodiment, a hydrophobic additive is a vegetable based wax, such as a sunflower wax, rice bran wax, or combinations thereof.

Other Additives

The aqueous resin composition may also comprise other additives that aid the manufacture of an abrasive article. Other additives can include clays; such as kaolin; salts, pH modifiers, adhesion promoters, thickeners, plasticizers, lubricants, bactericides, fungicides, wetting agents, antistatic agents, pigments, dyes, coupling agents; such as alkoxysilanes; flame retardants, degassing agents, anti-dusting agents, thixotropic agents, dual function materials, initiators, surfactants, chain transfer agents, stabilizers, dispersants, reaction mediators, pigments, dyes, and colorants, and defoamers.

Abrasive Particles

A plurality of abrasive particles can be applied to the polymer binder composition. The term abrasive particles, as used herein also encompasses abrasive grains, abrasive agglomerates, abrasive aggregates, green-unfired abrasive aggregates, shaped abrasive particles, and combinations thereof. As described previously, the plurality of abrasive particles can be applied to a make coat of the polymer binder composition, or be dispersed in a slurry coat of the polymer binder composition. Thus, the abrasive particles can be disposed on the polymer binder composition, be at least partially embedded in the polymer binder composition, or a combination thereof. The abrasive particles can generally have a Mohs hardness of greater than about 3, and preferably in a range from about 3 to about 10. For particular applications, the abrasive particles can have a Mohs hardness of at least 5, 6, 7, 8, or 9. In an embodiment, the abrasive particles have a Mohs hardness of 9. Suitable abrasive particles include non-metallic, inorganic solids such as carbides, oxides, nitrides and certain carbonaceous materials. Oxides can include silicon oxide (such as quartz, cristobalite and glassy forms), cerium oxide, zirconium oxide, and various forms of aluminum oxide (including fused aluminas, sintered aluminas, seeded and non-seeded sol-gel aluminas). Carbides and nitrides can include silicon carbide, aluminum carbide, aluminum nitride, aluminium oxynitride, boron nitride (including cubic boron nitride), titanium carbide, titanium nitride, and silicon nitride. Carbonaceous materials can include diamond, which broadly includes synthetic diamond, diamond-like carbon, and related carbonaceous materials such as fullerite and aggregate diamond nanorods. Suitable abrasive particles can also include a wide range of naturally occurring mined minerals, such as garnet, cristobalite, quartz, corundum, and feldspar. In particular embodiments, the abrasive particles can be diamond, silicon carbide, aluminum oxide, cerium oxide, or combinations thereof. Abrasive particles can be mixtures of two or more different abrasive particles or can be a single type of abrasive particle.

In a particular embodiment, the abrasive particles are derived from an environmentally sustainable material, a recyclable material, or a reusable material. In the embodiment, the abrasive particles are recycled abrasive particles. In a specific embodiment, the abrasive particles are recycled aluminum oxide particles.

Backing

In accordance with an embodiment, the backing can be an organic material, inorganic material, natural material, synthetic material, or combinations thereof. The backing can be flexible or rigid and can be made of a single material or combination of various materials. A particular flexible backing includes a polymeric film (for example, a primed film), such as polyolefin film (e.g., polypropylene including biaxially oriented polypropylene), polyester film (e.g., polyethylene terephthalate), polyamide film, or cellulose ester film; metal foil; mesh; foam (e.g., natural sponge material or polyurethane foam); cloth (e.g., cloth made from fibers or yarns comprising polyester, nylon, silk, cotton, poly-cotton, or rayon); paper; vulcanized paper; vulcanized rubber; vulcanized fiber; nonwoven materials; any combination thereof; or any treated version thereof. Cloth backings can be woven or stitch bonded. In a particular embodiment, the backing includes a thermoplastic film, such as a polyethylene terephthalate (PET) film. In particular, the backing can be a single layer polymer film, such as a single layer PET film. In particular embodiment, the backing is a flexible support material, sheet of paper, a film or a network of fibers, for example a mat, a felt, a fabric or a knit of natural or synthetic fibers, including mineral fibers, glass fibers, polymer fibers, plant fibers, or combinations thereof.

In a particular embodiment, the backing material is derived from an environmentally sustainable material, a recyclable material, or a reusable material. In a particular embodiment, the backing material is a recycled paper backing. In another particular embodiment, the backing material is a paper backing derived from plant material that originates from a well-managed forest, such as a Forest Stewardship Council managed forest, a controlled source of natural and recycled wood, natural and recycled plant fibers, and combinations thereof.

Size Coat

The coated abrasive article can comprise a size coat overlying the abrasive layer. The size coat can be the same as or different from the polymer binder composition used to form the abrasive layer. The size coat can comprise any conventional compositions known in the art that can be used as a size coat. In an embodiment, the size coat comprises a conventionally known composition overlying the polymer binder composition of the abrasive layer. In another embodiment, the size coat comprises the same ingredients as the polymer binder composition of the abrasive layer. In a specific embodiment, the size coat comprises the same ingredients as the polymer binder composition of the abrasive layer and one or more hydrophobic additives. In a specific embodiment, the hydrophobic additive can be a wax, a halogenated organic compound, a halogen salt, a metal, or a metal alloy.

Supersize Coat

The coated abrasive article can comprise a supersize coat overlying the size coat. The supersize coat can be the same as or different from the polymer binder composition or the size coat composition. The supersize coat can comprise any conventional compositions known in the art that can be used as a supersize coat. In an embodiment, the supersize coat comprises a conventionally known composition overlying the size coat composition. In another embodiment, the supersize coat comprises the same ingredients as at least one of the size coat composition or the polymer binder composition of the abrasive layer. In a specific embodiment, the supersize coat comprises the same composition as the polymer binder composition of the abrasive layer or the composition of the size coat plus one or more grinding aids.

Suitable grinding aids can be inorganic based; such as halide salts, for example sodium cryolite, and potassium tetrafluoroborate; or organic based, such as sodium lauryl sulphate, or chlorinated waxes, such as polyvinyl chloride. In an embodiment, the grinding aid can be an environmentally sustainable material.

Coated Abrasive Article Preparation

Polymer Binder Preparation

As shown in FIG. 3 an embodiment of a process 300 for preparing a coated abrasive article is given. At step 301, forming a polymer binder composition can be accomplished by mixing together a saccharide and a resin comprising at least two azetidinium groups (an azetidinium resin) in the presence of water. The saccharide, azetidinium resin, and water are combined together until thoroughly mixed. The polymer binder composition can additionally comprise other ingredients, such as proteins, starch grafted acrylic styrene co-polymer, co-crosslinking agents, rheology modifiers, fillers, hydrophobic additives, and other additives.

All the mixture ingredients are thoroughly mixed together using, for example, a high shear mixer. Mixing can be conducted using high shear conditions, medium shear conditions, or low shear conditions, as desired. Typically, mixing occurs until the ingredients are thoroughly mixed. During mixing of the ingredients, the ingredients may be added to the mixture one by one, in batches, or all at once.

The viscosity of the polymer binder mixture can be monitored as it is being prepared. In an embodiment, the viscosity of the polymer binder mixture can be kept in a particular range by the addition of rheology modifiers, thickeners, plasticizers, diluents, thixotropic agents, or combinations thereof. In the event of the addition of any solid components, such as abrasive particles during abrasive slurry preparation, the mixture can have a viscosity adjusted in a particular range.

The pH of the aqueous polymer binder composition is generally less than or equal to 8 and preferably greater than or equal to 5. In certain embodiments, the pH can be less than or equal to 7. The pH can be adjusted by the addition of a suitable base, for example, triethanolamine, ammonium hydroxide, sodium hydroxide or potassium hydroxide. In a particular embodiment, the pH of the aqueous polymer binder composition is adjusted with sodium hydroxide.

The viscosity of the aqueous polymer binder composition can vary depending on the desired application conditions but will generally remain less than or equal to 15,000 mPa·s, preferably less than or equal to 10,000 mPa·s, measured at 25° C. using a Brookfield machine fitted with an LV1 spindle operating at a speed of 60 rpm.

In an embodiment, the polymer binder mixture can have a ratio of total saccharide to total azetidinium resin in a range from about 6.0:1.0 to about 0.5:1.0, such as about 5.0:1.0 to about 1.0:1.0, or about 4.0:1.0 to about 1.0:1.0, or about 3.0:1.0 to about 1.0:1.0. In a particular embodiment, the polymer binder mixture can have a ratio of total saccharide to total azetidinium resin in a range from about 4.0:1.0 to about 2.0:1.0.

In an embodiment, the polymer binder composition can include
from about 5 wt % to about 40 wt % total saccharides,
from about 5 wt % to about 40 wt % total azetidinium resin, and
the remainder water,
where the percentages are based on total weight of the polymer binder mixture.

Optionally, from about 15 wt % to about 45 wt % of total other ingredients can also be added to the polymer binder composition. Total other ingredients can include proteins, starch grafted acrylic styrene co-polymer, co-crosslinking agents, rheology modifiers, fillers, hydrophobizing agents, and other additives. The amounts of the polymer binder components, including any optional total other ingredients, are adjusted so that the total amount adds up to 100 wt %.

In a particular embodiment, the polymer binder composition can include
from about 15 wt % to about 30 wt % total saccharides,
from about 5.0 wt % to about 15 wt % total azetidinium resin,
from about 2.0 wt % to about 20 wt % of co-cross-linking agent,
from about 2.0 wt % to about 40 wt % of total other ingredients, and
the remainder water,
where the percentages are based on total weight of the polymer binder composition.

The amounts of the abrasive slurry components are adjusted so that the total amounts add up to 100 wt %.

In another embodiment, the aqueous polymer binder composition, the amount, by weight of saccharide represents 10 to 90%, preferably 60 to 80%, of the weight of the polyazetidinium resin and saccharide.

In another embodiment, the amount of co-cross-linking agent represents up to 20 parts by weight per 100 parts by weight of the polyazetidinium resin and saccharide, preferably at least 5 parts.

In another embodiment, the amount, by weight, of rheology modifier can be up to 20 parts of the weight of the polyazetidinium resin and the saccharide.

The solids content of the aqueous polymer binder composition can be calculated. In an embodiment, the solids content can be calculated on the basis of all the organic constituents. In a specific embodiment, the solids content can be in a range from 30% to 75%, preferably from 45% to 70%.

In step 305, a make coat can be formed by disposing the polymer binder composition onto a backing. The polymer binder composition can be coated onto the backing using a blade spreader to form a make coat. Alternatively, the polymer binder composition can be applied using slot die, smooth rolling, gravure, or reverse gravure coating methods.

Abrasive particles can be applied to the make coat in step 307 through electrostatic attraction (sometimes called "upcoating") or simply down through gravity (e.g., sprinkled onto the backing). Both approaches are well understood in the art, generally first depositing a 'make coat' on the backing, followed by abrasive aggregate application onto the make coat, and subsequent deposition of a 'size coat' in step 311.

Optionally, a supersize coat may be deposited over the size coat as in step 313. Deposition of the supersize coat can be accomplished by the same methods as for the make coat and size coat.

In sum, the aqueous polymer binder composition can be used to form the make coat, the size coat or the supersize coat. Preferably, the aqueous composition is used to form the size coat, and where appropriate the make coat.

Applying an Abrasive Slurry to a Backing

As shown in FIG. 4, in an alternative method 400, an abrasive slurry containing the polymer binder composition and abrasive particles is mixed together. The aqueous polymer binder composition can be mixed as described above with the addition that a desired amount of abrasive particles are added in during the mixing process to form an abrasive slurry. The abrasive slurry is preferably applied to the backing using a blade spreader. Alternatively, the slurry coating can be applied using slot die, smooth rolling, gravure, or reverse gravure coating methods.

Curing the Make Coat, Abrasive Slurry, Size Coat, and Supersize Coat

The coated backing is then heated in order to cure the polymer binder composition and bond the abrasive particles (aggregates, grains, or combination thereof) to the backing. The polymer binder composition; whether in the form of a make coat, abrasive slurry, size coat, or supersize coat; can be at least partially cured or fully cured. Additional molding or shaping of a partially cured coating can be performed prior to full curing, if desired. Said molding and shaping can be performed on an abrasive slurry so that an engineered abrasive article, also called a structured abrasive article, is formed. Full curing completes crosslinking of the constituents contained in a coat. In general, the coated backing is heated to a temperature in a range of about 100° C. to less than about 250° C. during the curing process. In certain embodiments the curing step can be carried out at a temperature of less than about 200° C. In an embodiment, the application of each make coat or supersize coat is followed by a heat treatment at a temperature of less than or equal to 150° C., preferably less than or equal to 120° C., and advantageously between 50° C. and 100° C. The heat treatment can last from 1 to 120 minutes, preferably 1 to 90 minutes.

Once the resin is fully cured, the abrasive aggregates are bonded to the backing and the coated backing may be used for a variety of stock removal, finishing, and polishing applications.

The coated abrasive obtained may be cut to the desired size, for example to produce sheets, or collected in the form of a winding.

The winding may undergo an additional heat treatment with a view to completing the crosslinking of the aqueous composition forming the size coat or the supersize coat. This heat treatment may be carried out at a temperature less than or equal to 150° C., preferably less than or equal to 120° C., for at most 36 hours, preferably at most 20 hours.

Coated abrasive articles incorporating the aqueous polymer binder composition according to the embodiments can be, in particular, in the form of abrasive papers and abrasive fabrics.

The examples given below make it possible to illustrate the invention without however limiting it.

In the examples, the viscosity (in mPa·s) is measured at 25° C. using a Brookfield machine equipped with an LV1 spindle rotating at a speed of 60 rpm.

Examples 1 to 3

Preparation of an Aqueous Polymer Binder Composition

In a container, 80 parts (by dry weight) of a saccharide and 20 parts (by dry weight) of a polyazetidinium resin are mixed, with stirring, and the pH is adjusted to 5 with sodium hydroxide.

This composition is referred to as composition A.

The saccharide is a dextrin sold under the reference Roclys® 3072S by the company Roquette, which has a number-average molecular weight equal to 675 g/mol and a polydispersity index equal to 5.4.

The polyazetidinium resin is an aqueous resin sold under the reference Hercules® CA1025 (25% active solids) by the company Ashland, which is an adduct of epichlorohydrin and of a polyamidoamine obtained by reacting diethylenetriamine and adipic acid.

Manufacture of a Coated Abrasive

Use is made of the aqueous polymer binder composition A and a conventional urea formaldehyde binder composition, denoted by Reference (sold under the reference R2130 by the company Schenectady International, Inc.) in order to form coated abrasives.

Make Coat

The make coat is constituted either of composition B, which contains composition A and 15 parts by weight of kaolin (viscosity 700 mPa·s; solids content: 50%), or of composition C, which contains the Reference resin composition and 10 parts by weight of kaolin (viscosity 1000 mPa·s; solids content: 66%).

The make coat is deposited on a paper support using a film coater in a proportion of 70 g/m$^2$ (dry weight).

Abrasive particles of alumina (P80 grit) are sprinkled over the coat and the excess particles that have not adhered to said coat are removed.

The whole assembly is introduced into an oven at 85° C. for 20 minutes (composition C) or 60 minutes (composition B) then left to cool to room temperature (20-25° C.).

Size Coat

On the support coated with the make coat, the size coat is formed by application either of the resin composition A (viscosity 280 mPa·s) or of the Reference composition (viscosity 350 mPa·s) via roller coating, in a proportion of 110 g/m$^2$ (dry weight). The whole assembly is subjected to a heat treatment at 50° C. for 50 minutes (Reference composition) or at 85° C. for 60 minutes then at 115° C. for 2 hours (composition from step a)).

After cooling, discs are cut that are used to evaluate the abrasive performances on a wooden support.

For this, a sheet of wood (pine) is subjected to an abrasion test under the following conditions: a disc with a diameter of 125 mm bearing 8 holes with a diameter of 8 mm is placed on an electric sander (Bosch PEX 220A) which is used by an operator to carry out a manual sanding of the sheet of wood (length: 80 cm; width: 20 cm; thickness: 1.5 cm) with a linear movement in the length direction.

The loss of mass of the sheet of wood as a function of the sanding time is measured. The results are given in Table 1, expressed as the cumulative loss of mass.

Example 1 in accordance with the invention has a comparable abrasion capacity to that of comparative Example 3. Unexpectedly, Example 2, the make coat of which contains the Reference resin, has the highest abrasion capacity. Without wishing to be bound by theory, it appears that a synergistic abrading effect is produced by the inventive size coat.

Examples 4 to 9

These examples illustrate the preparation of coated abrasive articles on a pilot line.

From a reel, a sheet of paper (ARJOREG-185-MS-WHITE sold by ARJO WIGGINS; width: 30 cm; basis weight: 185 g/m$^2$; thickness 0.21 mm) is unwound and a make coat is deposited, continuously, using a transfer roll, then abrasive particles are deposited using an electrostatic coating device. The coated sheet is collected in the form of festoons on a suitable device which is then introduced into an oven at 85° C. for 20 minutes (Examples 4, 5 and comparative Example 9) or 60 minutes (Examples 6 to 8).

After cooling, the sheet is again wound in the form of a reel which is placed in the preceding unit in order to deposit the size coat on the face bearing the abrasive particles. The sheet is collected and treated under the following temperature conditions: 85° C. for 50 minutes (Examples 4 to 8) and 50° C. for 50 minutes (comparative Example 9).

The sheet is again wound in the form of a reel and introduced into an oven at 115° C. for 120 minutes (Examples 4 to 8).

The make coat is constituted either of the urea-formaldehyde (Reference) resin described in Examples 1 to 3 (Examples 4, 5 and comparative Example 9), or of compositions F, G and H (Examples 5, 6 and 7), the compositions of Examples 4 and 5 also comprising 10 parts by weight of kaolin. The make coat is deposited in a proportion of 52 g/m² (dry weight).

The abrasive particles are constituted of alumina (sold under the reference "Electrocorundum EKP, P80 grit" by the company Kuhmichel Abrasiv GmbH) and are deposited in a proportion of 165 g/m².

The size coat is constituted of the aqueous resin composition D to F (Examples 4 to 8, respectively) or of the aforementioned Reference resin (comparative Example 9). The size coat is deposited in a proportion of 120 g/m² (dry weight).

The aqueous resin compositions D to H comprise the constituents indicated in Table 2, in proportions expressed as parts by weight.

The abrasive sheet obtained is subjected to the abrasion test under the conditions described in Examples 1 to 3. The results appear in Table 3, expressed as cumulative loss of mass.

Examples 4 and 5 exhibit better abrasive performances than comparative Example 9. Example 4, using shorter saccharides than Example 5, gives better performances in the abrasion test.

Example 6, the make and size coats of which are formed of the resin according to the invention, has abrasive performances equivalent to that of comparative Example 9, with the advantage that it does not contain any formaldehyde-based resin.

Examples 7 and 8 have improved abrasive performances owing to the presence of the crosslinking agent.

TABLE 1

|  | Ex. 1 | Ex. 2 | Ex. 3 (comparative) |
|---|---|---|---|
| Coated abrasive |  |  |  |
| Make coat | B | C | C |
| Size coat | A | A | Reference |
| Abrasion test Cumulative loss of mass (g) |  |  |  |
| 2 minutes | 2.1 | 2.8 | 2.4 |
| 4 minutes | 3.9 | 5.7 | 4.1 |
| 6 minutes | 5.5 | 8.2 | 5.7 |
| 8 minutes | 7.1 | 10.1 | 7.1 |
| 10 minutes | 8.5 | 12.3 | 8.6 |
| 12 minutes | 9.8 | 14.3 | 9.9 |
| 14 minutes | 11.1 | 16.1 | 11.3 |
| 16 minutes | 12.3 | 18.1 | 12.5 |
| 18 minutes | 13.3 | 20.0 | 13.9 |
| 21 minutes | 14.8 | 22.6 | 15.8 |
| 24 minutes | 16.3 | 25.0 | 17.8 |
| 27 minutes | 17.7 | 27.4 | 19.8 |
| 30 minutes | 18.9 | 29.8 | 21.8 |

TABLE 2

| Composition | D | E | F | G | H |
|---|---|---|---|---|---|
| Polyazetidinium resin[1] | 20 | 20 | 20 | 20 | 20 |
| Saccharide |  |  |  |  |  |
| glucose syrup[2] | 80 | — | 80 | 80 | 80 |
| maltodextrin[3] | — | 80 | — | — | — |
| Glyoxal | — | — | — | 10 | 20 |
| Wetting agent[4] | 1 | 1 | 1 | 1 | 1 |
| pH | 5 | 5 | 7 | 7 | 7 |
| solids (%) | 53 | 63 | 53 | 51 | 50 |
| Viscosity (mPa·s) | 700 | 700 | 750 | 850 | 900 |

[1]Hercules ® CA1025 sold by the company Ashland; epichlorohydrin-polyamidoamine adduct obtained by reacting diethylenetriamine and adipic acid
[2]Roclys ® 3072S sold by Roquette; number-average molecular weight: 675 g/ml; polydispersity index (IP): 5.4
[3]Glucidex ® 19 D sold by Roquette; number-average molecular weight: 1165 g/ml; polydispersity index (IP): 8.6
[4]Tego ® Wet 500 sold by the company Evonik

TABLE 3

|  | Ex. 4 | Ex. 5 | Ex. 6 | Ex. 7 | Ex. 8 | Ex. 9 (comparative) |
|---|---|---|---|---|---|---|
| Coated abrasive |  |  |  |  |  |  |
| Make coat | Ref. | Ref. | F | G | H | Ref. |
| Size coat | D | E | F | G | H | Ref. |
| Abrasion test Cumulative loss of mass (g) |  |  |  |  |  |  |
| 2 minutes | 3.4 | 3.4 | 2.3 | 2.8 | 3.5 | 2.8 |
| 4 minutes | 6.6 | 5.5 | 3.8 | 5.1 | 6.3 | 4.3 |
| 6 minutes | 9.2 | 7.4 | 4.9 | 6.9 | 8.8 | 5.6 |
| 8 minutes | 12.0 | 9.2 | 5.8 | 8.6 | 11.2 | 6.6 |
| 10 minutes | 14.4 | 10.7 | 6.7 | 10.2 | 13.6 | 7.6 |
| 12 minutes | 16.5 | 12.2 | 7.6 | 11.9 | 15.6 | 8.5 |
| 14 minutes | 18.5 | 13.5 | 7.3 | 13.4 | 17.6 | 9.3 |
| 17 minutes | 21.5 | 15.4 | 9.3 | 15.4 | 20.3 | 10.5 |
| 20 minutes | 24.1 | 16.9 | 10.1 | 17.2 | 22.7 | 11.6 |

Coated Abrasive Hand Sample Examples

Coated Abrasives in the form of abrasive disks were prepared and tested as described below.

Make Coat Preparation

A make coat control sample (a conventional animal glue make coat) and an inventive sample were prepared as follows.

Make coat control: A 60° C. bath was used to warm a 136.08 grams of water to which was added 7.86 grams of glycerin (Brenntag) and 78.08 grams of 54 MPS animal glue (Milligan and Higgins) with mechanical stirring. To this mixture was added 78.06 grams of Duroc #1 calcium carbonate 325 (Specialty Minerals Inc.) mesh resulting a viscosity of 680 cP @ 60° C.

Make Coat Example 1: A mechanical stirrer was to mix a 120.8 grams of a 1% aqueous solution of Cellocise QP 100 MH ethyl cellulose (Dow Chemical). To this mixture was added 62.52 grams of corn syrup and 96.36 grams of Duroc #1 calcium carbonate 325 mesh. Prior to application of the make coat, 20.84 grams of CA1000 polyazetidinium (Ashland) was added with mechanical stirring. The resulting viscosity was 2800 cP.

Size Coat Preparation

A size coat control sample (a conventional urea formaldehyde size coat) and several inventive sample were prepared as follows.

Size Coat Control: A mixture was prepared with mechanical stirring of 133.25 grams of Durite C133-144 UF resin (Momentive), 4.53 grams of 25 ammonium chloride aqueous solution, 109.04 grams of Snow White 600 mesh, and 53.15 grams of water.

Size Coat Example 1: A mixture of 25.10 grams of corn syrup and 30.12 grams of water was prepared with a mechanical stirrer. To this mixture was added 36.41 grams of Duroc #1 calcium carbonate 325 mesh. Prior to application of the size coat 8.37 grams of CA1000 was added. The mixture exhibited a viscosity of 150 cP. The pH was adjusted to 7 with a 30% aqueous NaOH solution.

Size Coat Example 2: In the same manner as size coat example 1, a mixture of 25.01 grams of corn syrup, 8.34 grams of CA1000, 36.28 grams 325 mesh calcium carbonate, 0.38 grams Bacote 20 zirconium ammonium carbonate (MEL Chemicals) was prepared. The resulting viscosity was 380 cP.

Size Coat Example 3: In the same manner as size coat example 1, a mixture of 12.74 grams of corn syrup, 7.50 grams dextrin 123 (Tate and Lyle), 2.25 grams of Simplesse Whey Protein (CP Kelco), 7.50 grams CA1000, 3.75 grams Curesan 400, 36.22 grams of 325 calcium carbonate, and 3.82 grams of Aquesize 312B sunflower wax emulsion (Solv Inc.) and 26.23 grams of water was prepared. The resulting viscosity was 840 cP.

Size Coat Example 4: In the same manner as size coat example 1, a mixture of 11.17 grams of corn syrup, 6.57 grams dextrin 123 (Tate and Lyle), 1.97 grams of Simplesse Whey Protein (CP Kelco), 9.85 grams CA1000, 9.85 grams Curesan 400, 36.21 grams of 325 calcium carbonate, and 3.35 grams of Aquesize 312B sunflower wax emulsion (Solv Inc.) and 21.02 grams of water was prepared. The resulting viscosity was 750 cP.

Size Coat Example 5: In the same manner as size coat example 1, a mixture of 13.45 grams of corn syrup, 7.91 grams dextrin 123 (Tate and Lyle), 2.37 grams of Simplesse Whey Protein (CP Kelco), 7.91 grams CA1000, 0.36 grams Bacote 20, 36.27 grams of 325 calcium carbonate, and 4.03 grams of Aquesize 312B sunflower wax emulsion (Solv Inc.) and 27.69 grams of water was prepared. The resulting viscosity was 780 cP.

Size Coat Example 6: In the same manner as size coat example 1, a mixture of 13.10 grams of corn syrup, 7.71 grams dextrin 123 (Tate and Lyle), 2.31 grams of Simplesse Whey Protein (CP Kelco), 11.56 grams CA1000, 0.35 grams Bacote 20, 36.38 grams of 325 calcium carbonate, and 3.93 grams of Aquesize 312B sunflower wax emulsion (Solv Inc.) and 24.66 grams of water was prepared. The resulting viscosity was 550 cP.

Coated Abrasive Preparation—Make and Grain Application and Curing

The make coat control sample prepared above was applied to a backing to form a make coat. Abrasive grains were applied to the make coat. The control make coat was cured. An inventive coated abrasive sample was prepared in a similar manner using the inventive make coat a prepared above for comparison.

Coated Abrasive Hand Sample Control—Make and Grain Application Control: The animal glue based make coat, described above, was applied with a doctor blade on plain brown Cascade paper at 4 mil wet and 3.5 grams of 220 mesh aluminum oxide grain per square foot was applied using a Spellman ESU coater. The hand sample was dried 1 hour in a forced air oven.

Coated Abrasive Hand Sample Example 1—Make and Grain Application: The corn syrup based make coat (Make Coat Example 1) described above was applied in the same manner as the control sample. The sample was cured 1 hour @ 70° C. in a forced air oven.

Coated Abrasive Preparation—Size Coat Application and Curing

To the control hand sample described above, was applied the control size coat described previously. The size coat was cured to form a completed coated abrasive article. Several inventive coated abrasive samples was prepared in a similar manner using the inventive size coats prepared above for comparison.

Sized Hand Sample Control: The urea formaldehyde based size coat control described above, was applied 3 mil wet with a 2-roll coater to the cured make coat control and cured 1 hour @ 70° C. in a forced air oven.

Sized Hand Samples 1-6: The size coats in inventive examples 1-6 were applied individually to the inventive make coat hand example described above to yield sized inventive hand samples having a polysaccharide make coat and a polysaccharide based size coat. The application of the size coats and subsequent curing method was the same as used for the sized hand sample control.

Abrasive Testing of the Hand Samples

Figure 6:
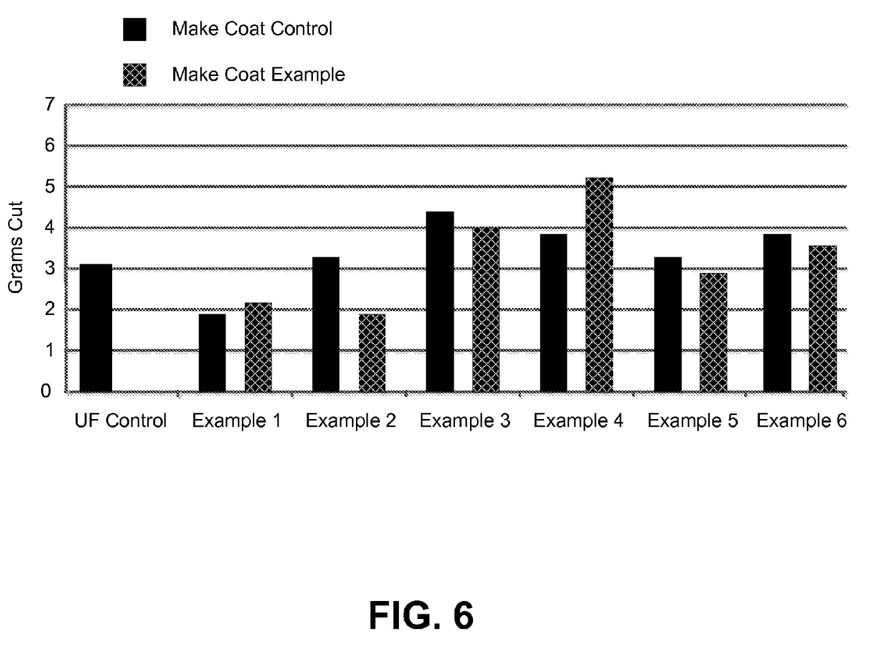
FIG. 6 is a chart comparing abrasive performance of coated abrasive embodiments according to the present invention with a state-of-the art coated abrasive

The control and inventive hand samples prepared and described as above were converted to 5" abrasive discs with Velcro backing and fitted onto a DA testing machine. The discs were applied at a 4° angle to acrylic panels for 2 minute intervals, with cut and surface roughness measurements between each interval. The total testing time was 12 minutes. The results are presented in FIG. 6. The abrasive data indicates that certain embodiments (Examples 4, 5, 6, and 7) provide greater cut than a control sample having a urea formaldehyde size coat. Additionally, Examples 4, 6, and 7 provide comparable abrasive performance to the control animal glue make coat hand sample. Moreover, Example 5 strikingly provides a total cut greater than both of the control samples. Without wishing to be bound to a theory, it is suspected that the presence of proteins and wax provide a synergistic resistance to moisture without a loss of hardness.

König Hardness Testing

The size coats (Size Coat Control and Size Coat Examples 1-6) were applied 3 mil wet with a drawdown bar to glass panes cut to size to fit in the König tester. Two samples were prepared for each size coat, the first set was cured at 70° C. for 1 hour in a forced air oven and the second set was cured at 110° C. Pendulum hardness results are depicted in Table 4 below.

TABLE 4

König Hardness of Cured Size Coats

| Size Coat | 70° C. Cure | 70° C. Cure |
|---|---|---|
| UF Control Size | 76 | — |
| Size Coat Example 1 | 76 | 80 |
| Size Coat Example 2 | 83 | 88 |
| Size Coat Example 3 | 58 | 72 |
| Size Coat Example 4 | 59 | 64 |
| Size Coat Example 5 | 66 | 82 |
| Size Coat Example 6 | 63 | 64 |

The data appears to indicate that a higher cure temperature increases the hardness of the size coat.

Contact Angle (Water)

Water drop contact angles were measured on the cured polysaccharide size coat samples 1-6 and are used to measure the hardness. The contact angle was measured using a Biolin Scientific Attension Theta Lite T101 instrument using deionized water as an average over a 10 second time period. The measurement was carried out to monitor the sensitivity of the cured coating to water as well as an indicator of degree of cure. The results are presented in Table 5 below.

TABLE 5

Contact Angle of Cured Polysaccharide Based Size Coats

| Size Coat | 70° C. Cure | 70° C. Cure |
|---|---|---|
| UF Control Size | 76 | — |
| Size Coat Example 1 | 76 | 80 |
| Size Coat Example 2 | 83 | 88 |
| Size Coat Example 3 | 58 | 72 |
| Size Coat Example 4 | 59 | 64 |
| Size Coat Example 5 | 66 | 82 |
| Size Coat Example 6 | 63 | 64 |

Additional Hand Samples—Size Coat Testing

Additional coated abrasive hand samples were prepared in a similar manner as described above. The make coat for all these hand samples was an animal glue. Aluminum oxide abrasive grains were applied to a make coat and the coated The control hand sample was sized with a conventional urea formaldehyde size coat. The inventive hand samples were sized with various coatings, some of which included the presence of proteins, co-cross-linkers, fillers, hydrophobic agents, and combinations thereof. The compositions for the hand samples are provided in Table 6 and 7 below.

TABLE 6

Size Coat Control Formulation

| Components | Size Control 1 wt % |
|---|---|
| UF Resin | 44.42 |
| Ammonium Chloride | 1.51 |
| Snow White 600 Mesh | 36.35 |
| Nopco NXZ Defoamer | 0.01 |
| Water | 17.72 |
| Total | 100.00 |

TABLE 7

Size Coat Example Formulations

| Components | Ex. Size 1 wt % | Ex. Size 2 | Ex. Size 3 | Ex. Size 4 | Ex. Size 5 | Ex. Size 6 | Ex. Size 7 | Ex. Size 8 |
|---|---|---|---|---|---|---|---|---|
| Corn Syrup | 25.12 | 25.10 | 23.76 | 23.75 | 15.84 | 14.99 | 12.74 | 12.04 |
| Dextrin | | | | | 7.92 | 7.50 | 7.50 | 7.09 |
| Simplesse Whey Protein | | | | | | | 2.25 | 2.13 |
| CA1000 | 6.28 | 8.37 | 7.92 | 7.92 | 7.92 | 7.50 | 7.50 | 7.09 |
| Duroc #1 Calcium Carbonate 325 Mesh | 35.87 | 36.41 | 36.63 | 36.59 | 36.63 | 36.22 | 36.22 | 36.16 |
| Degree 512 Glyoxal | | | 3.96 | | 3.96 | 3.75 | 3.75 | 7.09 |
| Aquesize 312B Sunflower Wax | | | | 4.04 | | 3.82 | 3.82 | 3.61 |
| Water | 32.72 | 30.12 | 27.72 | 27.71 | 27.72 | 26.23 | 26.23 | 24.80 |
| Total | 100 | 100 | 100 | 100 | 100 | 100 | 100 | 100 |

The completed coated abrasive articles were cut into discs and fitted onto a DA testing machine. The abrasive testing was conducted in the same manner as described above. An additional control, a conventional manufacturing produced abrasive disc having a phenolic make coat and size coat, was also tested on the DA machine for comparison. The abrasive performance results (cumulative cut and surface roughness) are presented in FIG. 7.

Figure 7:
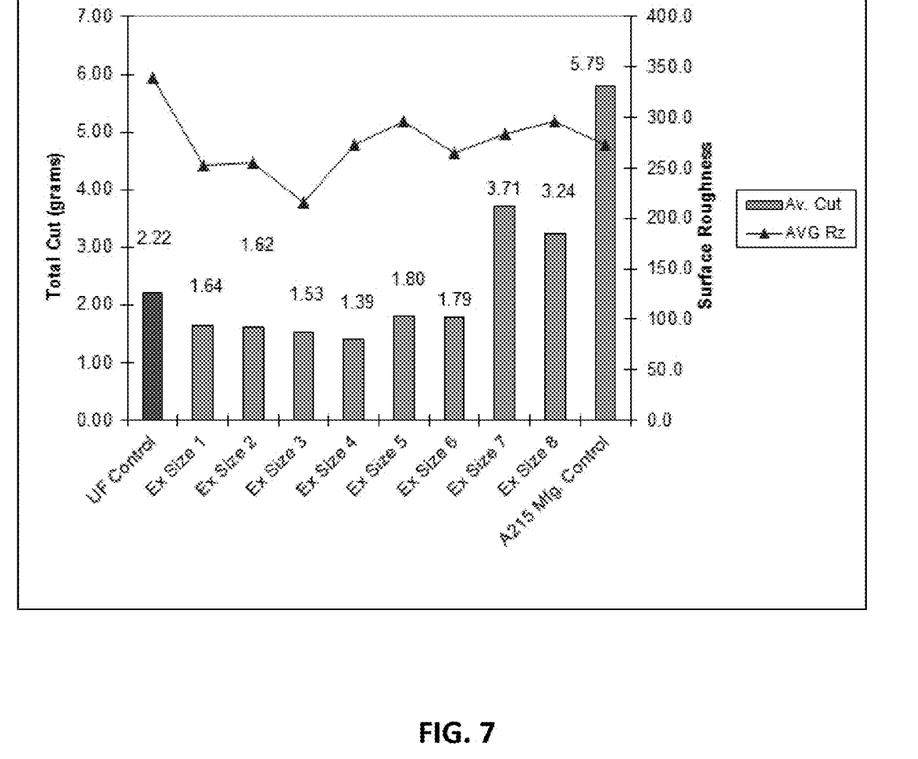
FIG. 7 is a chart comparing abrasive performance of coated abrasive embodiments according to the present invention with state-of-the art coated abrasives The use of the same reference symbols in different drawings indicates similar or identical items.

The data shows generally that the inventive samples had a lower cumulative cut, but did provide a smoother abraded surface than the urea formaldehyde control size coat hand sample. Surprisingly, Ex Size 6 and Ex Size 7, provided a cumulative cut higher than the urea formaldehyde control hand sample. Moreover, even with a higher cut, the abraded surface yielded a lower average roughness than the urea formaldehyde control hand sample. Without wishing to be bound by any theory, it appears that a synergistic abrasive performance is achieved when a combination of saccharides, protein, co-cross-linking agent, and hydrophobic agent are present in the size coat composition.

The invention claimed is:

1. A coated abrasive article comprising:
  a backing; and
  an abrasive layer overlying the backing;
  wherein the abrasive layer comprises
    abrasive particles and
    a polymer binder composition including
      at least one saccharide,
      a resin having at least two azetidinium groups, and
      a co-cross-linking agent comprising glyoxal, a carboxylic acid containing a ketone function, or a carboxylic acid containing an aldehyde function.

2. A coated abrasive article comprising:
  a backing; and
  an abrasive layer overlying the backing; and
  a size coat comprising
    a polymer binder composition including
      at least one saccharide,
      a resin having at least two azetidinium groups, and
      a co-cross-linking agent comprising glyoxal, a carboxylic acid containing a ketone function, or a carboxylic acid containing an aldehyde function.

3. A coated abrasive article comprising:
a backing;
abrasive particles; and
a polymer binder composition comprising, based on the weight of the polymer binder composition,
about 5.0 wt % to about 40 wt % saccharide,
about 5.0 wt % to about 30 wt % azetidinium resin,
about 2.0 wt % to about 20 wt % of a co-cross-linking agent comprising glyoxal, a carboxylic acid containing a ketone function, or a carboxylic acid containing an aldehyde function;
a protein in an amount up to 30 wt %; and
a hydrophobic additive in an amount up to 15 wt %.

4. A coated abrasive article according to claim 1, 2, or 3 wherein the saccharide is corn syrup, dextrin, or a combination thereof.

5. A coated abrasive article according to claim 1, 2, or 3 wherein the ratio of the saccharide to azetidinium resin is in a range of 4:1 to 1:1.

6. A coated abrasive article according to claim 1, 2, or 3 wherein the polymer binder further comprises at least one member selected from the group consisting of starch grafted acrylic styrenes and rheology modifiers.

7. A coated abrasive article according to claim 1 or 2 wherein the polymer binder further comprises a protein and a hydrophobic additive.

8. A coated abrasive article according to claim 1, 2, or 3 wherein the polymer binder, when fully cured has a Koenig hardness in a range of 45 to 100.

9. The coated abrasive article according to claim 1, wherein the polymer binder further comprises a protein comprising a soy protein, a milk protein, or a combination thereof.

10. The coated abrasive article according to claim 2, wherein the polymer binder further comprises a protein comprising a soy protein, a milk protein, or a combination thereof.

11. The coated abrasive article according to claim 3, wherein the protein comprises a soy protein, a milk protein, or a combination thereof.

12. The coated abrasive article according to claim 1, wherein the polymer binder further comprises a hydrophobic additive comprising a tall oil fatty acid dimer emulsion, an abietic acid salt, a tree rosin soap, a vegetable based wax, a levulinic acid, or a combination thereof.

13. The coated abrasive article according to claim 2, wherein the polymer binder further comprises a hydrophobic additive comprising a tall oil fatty acid dimer emulsion, an abietic acid salt, a tree rosin soap, a vegetable based wax, a levulinic acid, or a combination thereof.

14. The coated abrasive article according to claim 3, wherein the hydrophobic additive comprising a tall oil fatty acid dimer emulsion, an abietic acid salt, a tree rosin soap, a vegetable based wax, a levulinic acid, or a combination thereof.

15. The coated abrasive article according to claim 1, wherein the polymer binder further comprises a starch grafted acrylic styrene co-polymer.

16. The coated abrasive article according to claim 2, wherein the polymer binder further comprises a starch grafted acrylic styrene co-polymer.

17. The coated abrasive article according to claim 1, wherein the polymer binder further comprises a naturally occurring filler material.

18. The coated abrasive article according to claim 2, wherein the polymer binder further comprises a naturally occurring filler material.

* * * * *